United States Patent
Egami et al.

(10) Patent No.: US 8,043,011 B2
(45) Date of Patent: Oct. 25, 2011

(54) ROLLING BEARING FOR TENTER CLIP

(75) Inventors: Masaki Egami, Mie (JP); Yosuke Oya, Mie (JP)

(73) Assignee: NTN Corporation, Osaka (JP)

( * ) Notice: Subject to any disclaimer, the term of this patent is extended or adjusted under 35 U.S.C. 154(b) by 682 days.

(21) Appl. No.: 12/159,917

(22) PCT Filed: Jan. 23, 2007

(86) PCT No.: PCT/JP2007/050955
§ 371 (c)(1),
(2), (4) Date: Jul. 2, 2008

(87) PCT Pub. No.: WO2007/088750
PCT Pub. Date: Aug. 9, 2007

(65) Prior Publication Data
US 2009/0274407 A1    Nov. 5, 2009

(30) Foreign Application Priority Data

Jan. 31, 2006 (JP) .................. 2006-022547
Jan. 31, 2006 (JP) .................. 2006-022577

(51) Int. Cl.
*F16C 33/72* (2006.01)
*F16C 33/66* (2006.01)
(52) U.S. Cl. .................. 384/477; 384/462
(58) Field of Classification Search .......... 384/477, 384/462
See application file for complete search history.

(56) References Cited

U.S. PATENT DOCUMENTS

| 6,572,269 B2 | 6/2003 | Yabe et al. |
| 2005/0100259 A1 | 5/2005 | Egami et al. |

FOREIGN PATENT DOCUMENTS

| EP | 1529975 | 5/2005 |
| JP | 2002-310171 | 10/2002 |
| JP | 2004-301167 | 10/2004 |
| JP | 2005-140261 | 6/2005 |
| WO | WO 02/092683 | 11/2002 |

*Primary Examiner* — Thomas R Hannon
(74) *Attorney, Agent, or Firm* — Ditthavong Mori & Steiner, P.C.

(57) ABSTRACT

The present invention provides a rolling bearing, for a tenter clip, which is capable of restraining deterioration of a sealing member even though the sealing member contacts ester oil, and is excellent in reliability and durability at high temperatures. A periphery of an outer ring of the rolling bearing for use in the tenter clip of a film-stretching apparatus is lubricated with the ester oil. In the sealing member which covers openings disposed at both axial ends of an inner ring and the outer ring of the rolling bearing, at least a portion of the sealing member which contacts the ester oil is made of (A) a fluororubber molding of a vulcanizable fluororubber composition which comprises a copolymer containing tetrafluoroethylene (TFE), propylene, and a to-be-crosslinked monomer consisting of unsaturated hydrocarbon, having two to four carbon atoms, in which a part of hydrogen atoms is substituted with fluorine atoms or (B) a fluororubber molding of at least one fluororubber composition selected from a vulcanizable fluororubber composition containing a TFE-propylene binary copolymer and a vulcanizable fluororubber composition containing a vinylidene fluoride-TFE-propylene ternary copolymer.

7 Claims, 5 Drawing Sheets

ROLLING BEARING FOR TENTER CLIP

TECHNICAL FIELD

The present invention relates to a rolling bearing for a tenter clip for use in a film-stretching apparatus.

BACKGROUND OF THE INVENTION

An example of an apparatus for molding a stretched film made of resin is shown in FIGS. 4 and 5. FIG. 4 shows an example of an apparatus for producing a biaxially oriented film made of resin. FIG. 5 shows a guide rail of a transversely stretching device of FIG. 4. As shown in FIGS. 4 and 5, the apparatus for producing a biaxially oriented film has an extruder 9 for fusing and kneading resin, a die head (T die) 10 for shaping the fused and kneaded resin into a raw sheet and extruding the resin, a longitudinally stretching device 11 for longitudinally stretching the raw sheet, a transversely stretching device 13 for widthwise stretching the sheet which has been longitudinally stretched, and a drawing/winding device 14 for drawing and winding a biaxially oriented film stretched longitudinally and transversely. The transversely stretching device 13 has a pair of guide rails 12 which circulate, a plurality of tenter clips 15 which circulate on the guide rails 12 at regular intervals, and a device for heating the sheet.

As shown in FIG. 5, in the transversely stretching device 13, the longitudinally stretched sheet is widthwise stretched along large-width portions 12a, 12b of the guide rails 12 with both edges of the sheet being successively gripped by the plurality of tenter clips 15, while the sheet is being heat-treated to form a biaxially oriented film stretched longitudinally and transversely. As shown in FIG. 4, the biaxially oriented film is wound by the drawing/winding device 14.

A rolling bearing for the tenter clip 15 is exposed to a temperature of 200 to 250° C. inside the transversely stretching device 13 for heat-treating the sheet. Therefore as a lubricant for the rolling bearing for the tenter clip, generally fluorine grease is enclosed therein in consideration of heat resistance thereof.

Ester oil is often used to lubricate the guide rail 12. When the ester oil penetrates into the bearing in which the fluorine grease is enclosed, the fluorine grease leaks from the bearing because the ester oil has a higher degree of affinity for metal than the fluorine grease. As a result, the heat resistance of the bearing deteriorates. In the rolling bearing for use in the tenter clip, as a method for preventing the leak of the fluorine grease, a method of using a mixed oil of the ester oil and fluorine oil as a base oil is known (see patent document 1).

The method of using the mixed oil of the ester oil and the fluorine oil as the base oil is effective for preventing the leak of the fluorine grease. By using an appropriate material for a sealing apparatus of the bearing, for example, a sealing member of the bearing, it is possible to effectively prevent the penetration of the ester oil and the leak of the fluorine grease. In this case, as the sealing apparatus, a noncontact or light contact sealing member made of rubber is suitable. In consideration of an atmospheric temperature, generally fluororubber is used as the rubber material. As a fluororubber composition which is conventionally used as a material for sealing the bearing, generally vinylidene fluoride rubber (hereinafter referred to as FKM) such as a vinylidene fluoride-hexafluoropropylene binary copolymer (VDF-HFP), a ternary copolymer (VDF-HFP-TFE) obtained by adding tetrafluoroethylene to the above-described binary copolymer, and the like are used.

However, the above-described fluororubber compositions may swell depending on a state of contact with oil and a temperature because the fluororubber compositions have a high polarity and a high affinity for the ester oil. Generally the sealing member is made of a composite material consisting of a core made of a metal plate and rubber. When the rubber portion swells, a sealing portion of the noncontact sealing member contacts oil or in the case of the light contact sealing member, the tensional force of the sealing portion increases. As a result, there arises a problem that the rotational torque of the bearing increases.

Because the film-stretching apparatus is used at high temperatures, generally an antioxidant such as an amine compound is added to the ester oil serving as the lubricating oil for the guide rail to prevent oxidative deterioration thereof. When amine contacts the FKM, a crosslinking reaction occurs at the vinylidene fluoride of the FKM and consequently the rubber hardens and deteriorates.

Patent document 1: Japanese Patent Application Laid-Open No. 2004-301167

SUMMARY OF THE INVENTION

The present invention has been made to solve the above-described problems. Embodiments of the present invention advantageously provide a rolling bearing, for a tenter clip, which is capable of restraining deterioration of a sealing member, even though the sealing member contacts ester oil serving as lubricating oil for a guide rail, and is excellent in reliability and durability at high temperatures.

A rolling bearing of the present invention for a tenter clip has an inner ring; an outer ring; a plurality of rolling elements interposed between the inner ring and the outer ring; and a sealing member covering openings disposed at both axial ends of the inner ring and the outer ring.

The sealing member is a fluororubber molding obtained by molding a vulcanizable fluororubber composition expressed by (A) or (B) shown below:
(A) a vulcanizable fluororubber composition which comprises a copolymer containing tetrafluoroethylene, propylene, and a to-be-crosslinked monomer consisting of unsaturated hydrocarbon, having two to four carbon atoms, in which a part of hydrogen atoms is substituted with fluorine atoms,
(B) at least one fluororubber composition selected from a vulcanizable fluororubber composition containing a tetrafluoroethylene-propylene binary copolymer and a vulcanizable fluororubber composition containing a vinylidene fluoride-tetrafluoroethylene-propylene ternary copolymer.

The to-be-crosslinked monomer of the vulcanizable fluororubber composition expressed by the above (A) is at least one monomer selected from among trifluoroethylene; 3,3,3-trifluoropropene-1; 1,2,3,3,3-pentafluoropropene; 1,1,3,3,3-pentafluoropropylene; and 2,3,3,3-tetrafluoropropene. And the above copolymer contains vinylidene fluoride.

In the rolling bearing of the present invention for a tenter clip, grease is enclosed on peripheries of the rolling elements, and a periphery of the outer ring is lubricated with ester oil. The ester oil contains an amine-based additive.

The grease is either a single fluorine grease or a grease which comprises a base oil which is a mixed oil of fluorine oil and ester oil and a thickener consisting of a mixture of a diurea compound and polytetrafluoroethylene (hereinafter referred to as PTFE) resin powder.

In the rolling bearing of the present invention for a tenter clip, a portion of the sealing member which contacts ester oil for lubricating the outer ring thereof is made of the molding of the vulcanizable fluororubber composition shown by the above-described (A) or (B). Therefore even though the sealing member contacts the ester oil, the sealing member has a small swelling-caused volume change and is capable of preventing an increase in the rotational torque of the bearing. In addition, the sealing member is capable of effectively preventing the penetration of a foreign matter. Furthermore even in the case where the ester oil contains an amine-based additive, rubber little hardens and deteriorates. Therefore it is possible to improve the durability at high temperatures and the resistance to oil of the rolling bearing for the tenter clip which is used in the device for stretching a resin film.

DETAILED DESCRIPTION OF EXEMPLARY EMBODIMENTS OF THE INVENTION

Figure 1:
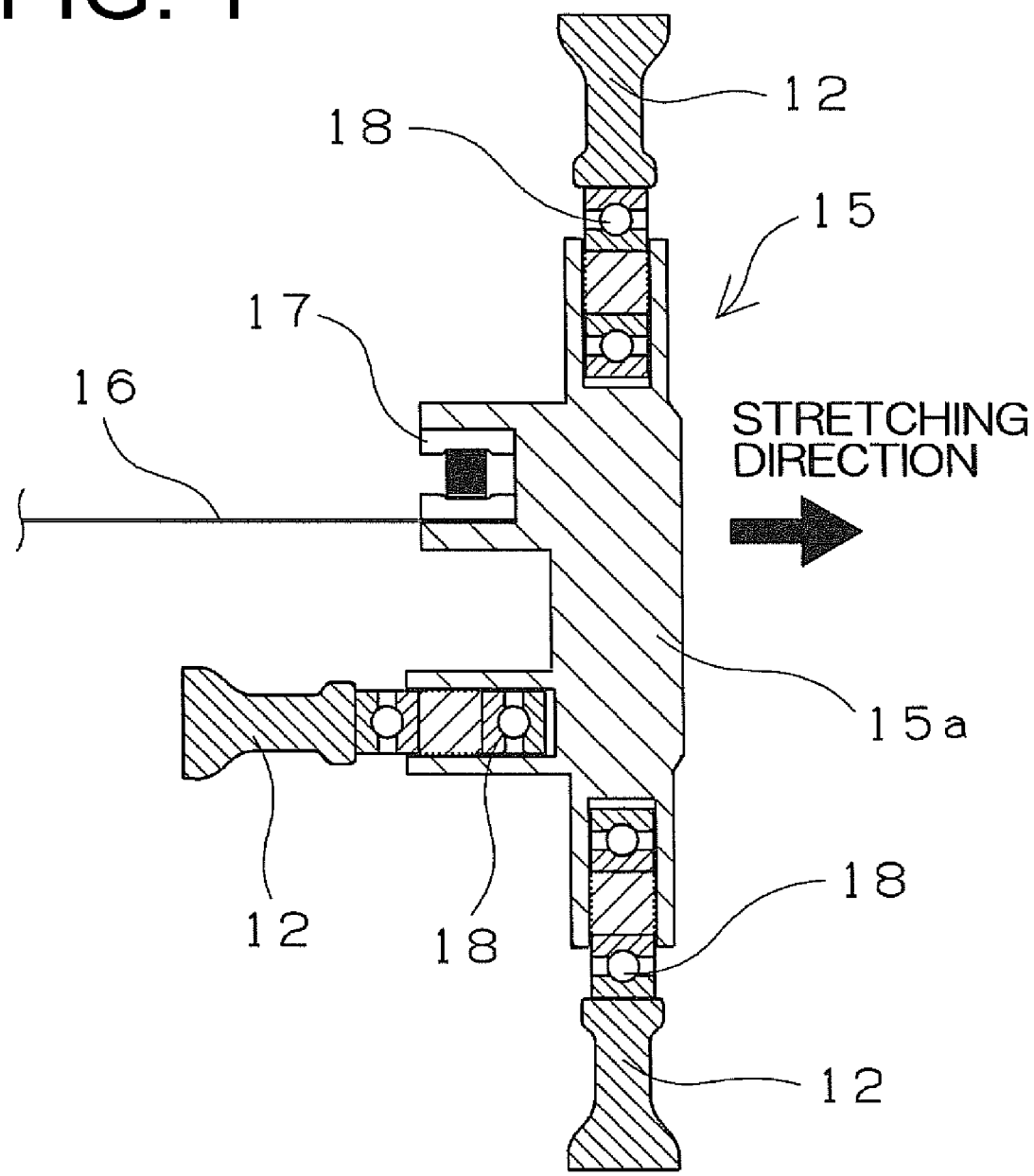
FIG. 1 is a sectional view showing an example of a tenter clip for which the rolling bearing of the present invention is used.
Figure 5:
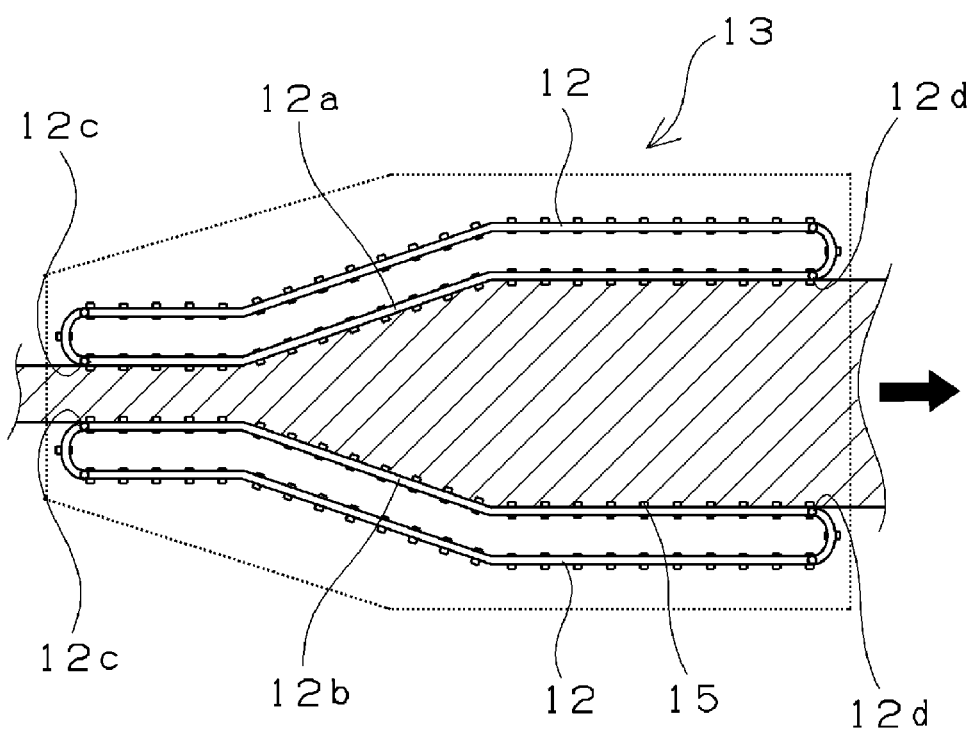
FIG. 5 is a top view of a guide rail of a transversely stretching device of FIG. 4.

FIG. 1 is a sectional view showing an example of a tenter clip for which the rolling bearing of the present invention is used. As shown in FIG. 1, a tenter clip 15 has a holding portion 17 for holding one edge 16 of a sheet and a plurality of rolling bearings 18, for the tenter clip, for allowing a tenter clip body 15a to travel with the tenter clip body 15a being guided by a guide rail 12. As shown in FIGS. 1 and 5, the tenter clip 15 circulates inside the transversely stretching device 13 along the guide rail 12. With one edge 16 of the longitudinally stretched sheet being held by the holding portion 17 at an entrance 12c of the guide rail 12 and being heat-treated, the sheet is widthwise stretched at the guide rail large-width portions 12a, 12b owing to the travel of the tenter clip 15. The sheet stretched longitudinally and widthwise is formed as a biaxially oriented film. At a guide rail exit 12d, the holding portion 17 releases the holding state. The tenter clip 15 returns to the entrance of the transversely stretching device 13 along the guide rail 12. The rolling bearing 18 for the tenter clip is subjected to heat treatment performed inside the transversely stretching device 13 and sprayed ester oil for assisting the travel of the tenter clip 15. To prevent oxidative deterioration of the ester oil in a high-temperature condition inside the stretching device, an amine-based additive is added to the ester oil. An outer ring of the bearing 18 and the guide rail 12 are lubricated by the ester oil.

Figure 2:
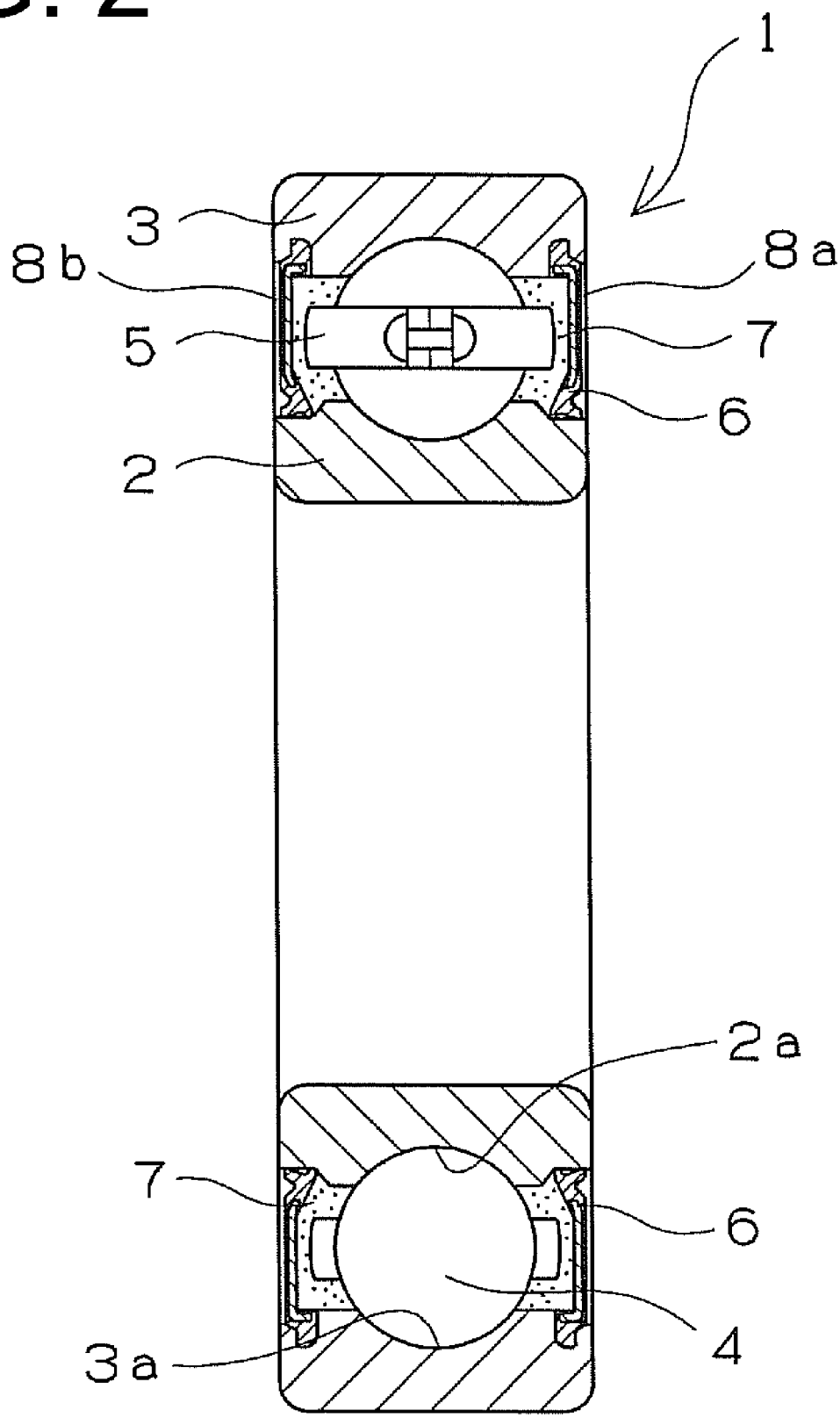
FIG. 2 is a sectional view showing an example of a rolling bearing of the present invention.

An example of the rolling bearing 18 of the present invention for the tenter clip is shown in FIG. 2. FIG. 2 is a sectional view of a deep groove ball bearing.

As shown in FIG. 2, a deep groove ball bearing 1 utilized as a rolling bearing for the tenter clip includes an inner ring 2 having an inner ring rolling surface 2a on its peripheral surface; an outer ring 3 concentric with the inner ring 2 and having an outer ring rolling surface 3a on its inner peripheral surface; and a plurality of rolling elements 4 disposed between the inner ring rolling surface 2a and the outer ring rolling surface 3a. A grease composition 7 is enclosed essentially on the periphery of the rolling elements 4. A sealing member 6, a retainer 5 holding the plurality of rolling elements 4, the outer ring 3, and the like is provided at openings 8a and 8b disposed at both axial ends of the inner ring 2 and the outer ring 3 to prevent penetration of ester oil sprayed to assist the travel of the tenter clip and a foreign matter. A portion of the sealing member 6 which contacts the ester oil is essentially composed of (A) molding of a vulcanizable fluororubber composition which comprises a copolymer containing tetrafluoroethylene, propylene, and a to-be-crosslinked monomer consisting of unsaturated hydrocarbon, having two to four carbon atoms, in which a part of hydrogen atoms is substituted with fluorine atoms or (B) molding of at least one fluororubber composition selected from a vulcanizable fluororubber composition containing a tetrafluoroethylene-propylene binary copolymer and a vulcanizable fluororubber composition containing a vinylidene fluoride-tetrafluoroethylene-propylene ternary copolymer.

The sealing member 6 may consist of a rubber molding containing at least the above-described fluororubber molding or may be a composite composed of the rubber molding and a metal plate, the rubber molding and a plastic plate or the rubber molding and a ceramic plate. The composite composed of the rubber molding and the metal plate is preferable, because the composite is durable and the rubber molding and the metal plate can be fixed easily to each other.

Figure 3:
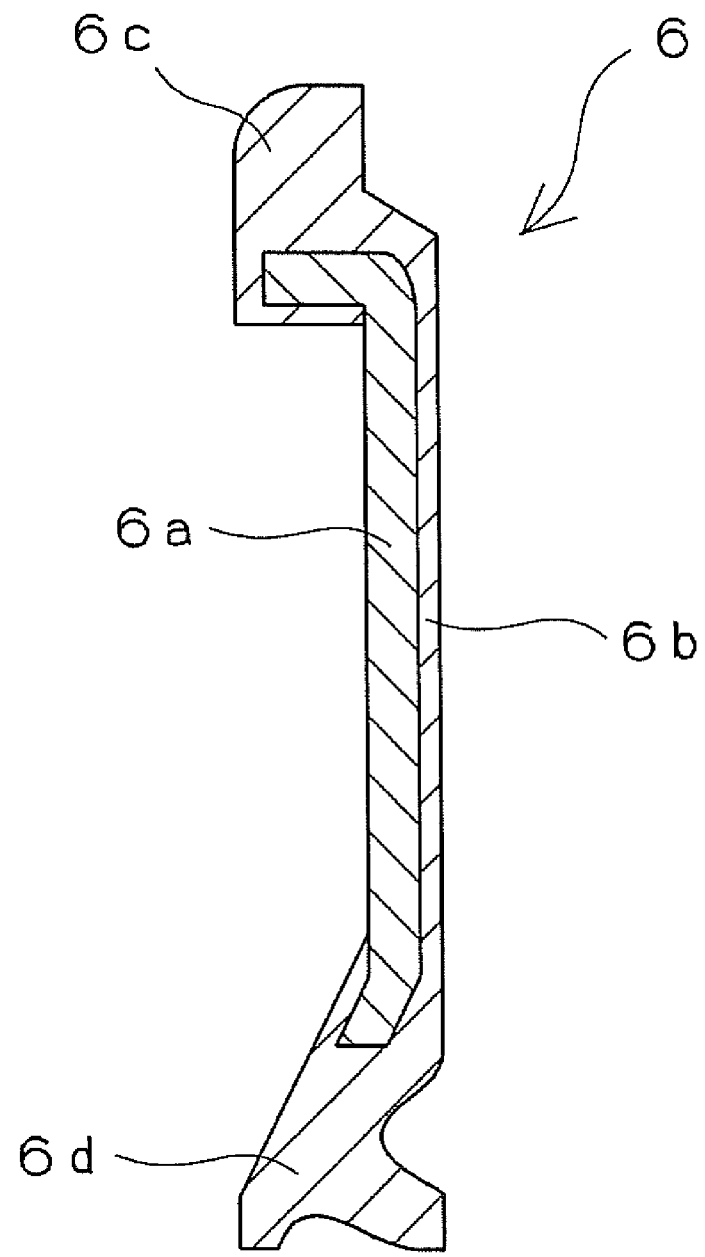
FIG. 3 is a sectional view showing an example of a sealing member according to an embodiment of the present invention.
Figure 4:
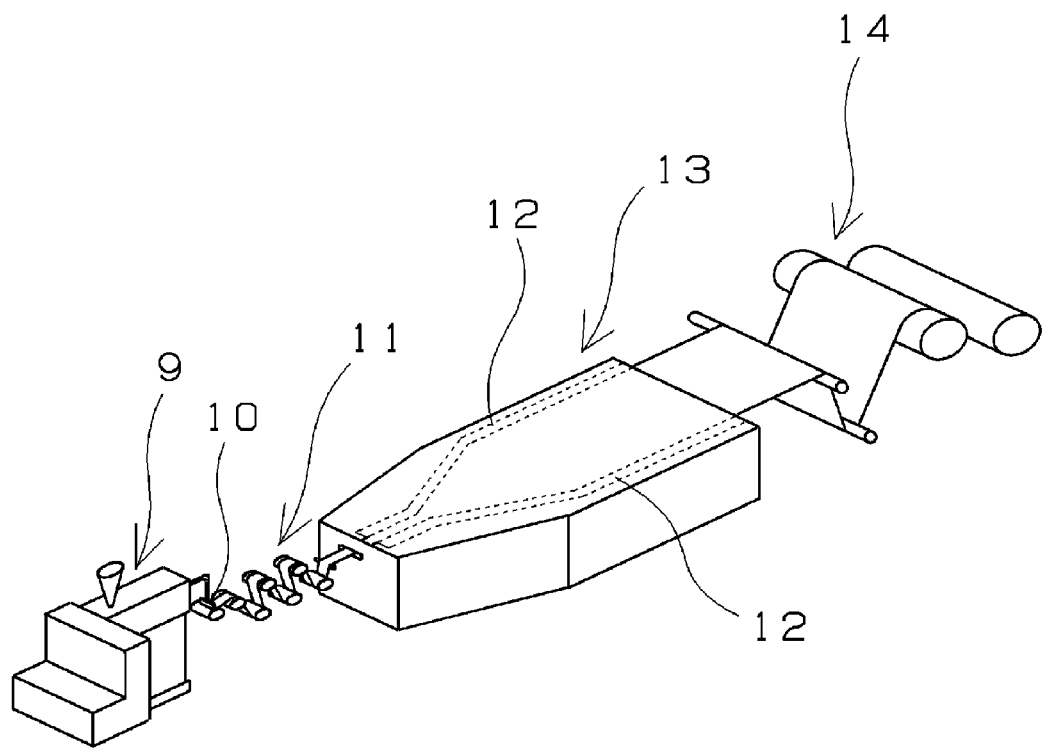
FIG. 4 is a perspective view of an example of an apparatus for producing a biaxially oriented film made of resin.

FIG. 3 shows an example of the sealing member 6 consisting of the composite of the rubber molding and the metal plate. The sealing member 6 is obtained by fixing a rubber molding 6b to a metal plate 6a such as a steel plate. As a fixing method, both a mechanical fixing method and a chemical fixing method can be used. It is preferable to adopt a fixing method in which when the rubber molding is vulcanized, molding and vulcanization are performed at the same time to fix the rubber molding to the metal plate, with the metal plate disposed in a vulcanizing die.

As methods of mounting the sealing member 6 on the outer ring and the like, the following methods can be used: (1) One end 6c of the sealing member 6 is fixed to the outer ring 3, whereas the other end 6d thereof is disposed along a V-shaped groove of a sealing surface of the inner ring 2 to form a labyrinth gap, (2) the one end 6c of the sealing member 6 is fixed to the outer ring 3, whereas the other end 6d thereof is brought into contact with a side surface of the V-shaped groove of the sealing surface of the inner ring 2, and (3) the one end 6c of the sealing member 6 is fixed to the outer ring 3, whereas the other end 6d thereof to be brought into contact with the side surface of the V-shaped groove of the sealing surface of the inner ring 2 is provided with a slit on the lip portion thereof for preventing suction to form a low torque construction.

In any of the above-described mounting methods, the ester oil present on the periphery of the sealing member 6 contacts the rubber molding 6b composing the sealing member 6. A portion of the rubber molding 6b that contacts the ester oil should be essentially made of the above-described fluororubber molding. For example, the rubber molding 6b may consist of the fluororubber molding, or a portion of the rubber molding 6b which contacts the ester oil may consist of the fluororubber molding and a conventional rubber molding may be layered on the rear surface of the fluororubber molding.

When grease which deteriorates a fluororubber seal made of FKM such as urea-based grease is used as grease to be enclosed in the bearing, it is preferable that a portion which contacts the grease is also formed of the above-described fluororubber molding.

The fluororubber composition of the present invention for forming the fluororubber molding is vulcanizable and comprises the copolymer containing the tetrafluoroethylene; the propylene; and the to-be-crosslinked monomer consisting of unsaturated hydrocarbon, having two to four carbon atoms, in which a part of hydrogen atoms is substituted with fluorine atoms.

As the to-be-crosslinked monomer, consisting of the unsaturated hydrocarbon, having two to four carbon atoms, in which a part of the hydrogen atoms is substituted with the fluorine atoms, trifluoroethylene; 3,3,3-trifluoropropene-1; 1,2,3,3,3-pentafluoropropene; 1,1,3,3,3-pentafluoropropylene; and 2,3,3,3-tetrafluoropropene are listed. The 3,3,3-trifluoropropene-1 is preferable as the to-be-crosslinked monomer.

The copolymer which can be used in the present invention may contain vinylidene fluoride, chlorotrifluoroethylene, perfluoro(alkylvinyl)ether, perfluoro(alkoxyvinyl)ether, perfluoro(alkoxyalkylvinyl)ether, perfluoroalkylalkenyl ether, and perfluoroalkoxyalkenyl ether as the fourth component thereof.

The mixing ratio of the tetrafluoroethylene to the entire copolymer composing the fluororubber composition is 45 to 80 wt %, favorably 50 to 78 wt %, and more favorably 65 to 78 wt %; the mixing ratio of the propylene thereto is 10 to 40 wt %, favorably 12 to 30 wt %, and more favorably 15 to 25 wt %; and the mixing ratio of the to-be-crosslinked monomer thereto is 0.1 to 15 wt %, favorably 2 to 10 wt %, and more favorably 3 to 6 wt %.

When the vinylidene fluoride is copolymerized, the mixing ratio thereof to the entire copolymer is 2 to 20 wt % and favorably 10 to 20 wt %. When the mixing ratio of the vinylidene fluoride is more than 20 wt %, there is a fear that the resistance of the copolymer to an amine-based additive added to the ester oil sprayed to assist the travel of the tenter clip may deteriorate and that when an urea compound is used as a thickener of enclosed grease, the resistance of the copolymer to the urea compound may deteriorate.

As disclosed in international laid-open publication No. WO02/092683, for example, the fluororubber is produced by emulsion polymerization or suspension polymerization.

To allow the fluororubber to be vulcanizable, it is possible to add thereto a polyhydroxy (polyol) vulcanizing agent; a vulcanizing accelerator selected from among quaternary ammonium salts, quaternary phosphonium salts, tertiary sulfonium salts; an acid-accepting agent such as calcium hydroxide, magnesium oxide, and the like; a filler such as carbon black, clay, barium sulfate, calcium carbonate, magnesium silicate, and the like; a processing aid such as octadecyl amine, wax, and the like; a thermal aging inhibitor; and a pigment. Regarding the mixing amount of each agent for 100 parts by weight of the copolymer, the vulcanizing agent is 0.1 to 20 and favorably 0.5 to 3 parts by weight; the vulcanization accelerating agent is 0.1 to 20 parts by weight and favorably 0.5 to 3 parts by weight; the acid-accepting agent is 1 to 30 parts by weight and favorably 1 to 7 parts by weight; the filler is 5 to 100 parts by weight; and the processing aid is 0.1 to 20 parts by weight.

In addition to these agents, it is possible to add 0.7 to 7 parts by weight and favorably one to three parts by weight of a second vulcanizing agent such as an organic peroxide compound to the fluororubber. In addition, fillers and additives to be contained in known rubber compositions can be appropriately used within a range in which they do not damage the resistance of the copolymer to an amine compound contained in the ester oil and to the urea compound serving as a thickener and the sealing performance thereof.

Other fluororubber compositions of the present invention for forming the fluororubber molding consist of at least one fluororubber composition selected from the vulcanizable fluororubber composition containing the tetrafluoroethylene-propylene binary copolymer and the vulcanizable fluororubber composition containing the vinylidene fluoride-tetrafluoroethylene-propylene ternary copolymer.

The tetrafluoroethylene-propylene binary copolymer which can be used in the present invention contains a repeating unit (1-1) and a repeating unit (1-2) shown in a chemical formula 1 in its molecule.

[Chemical formula 1]

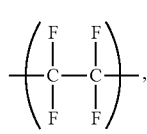
(1-1)

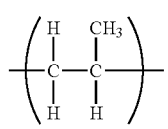
(1-2)

The repeating unit (1-1) is formed of a tetrafluoroethylene monomer. The repeating unit (1-2) is formed of a propylene monomer. The content ratio of the repeating unit (1-1) to the entire binary copolymer is 20 to 80 mol % and preferably 40 to 60 mol %. The content ratio of the repeating unit (1-2) to the entire binary copolymer is 20 to 80 mol % and preferably 40 to 60 mol %.

As commercially available products of the tetrafluoroethylene-propylene binary copolymer that can be used in the present invention, AFLAS 150 series and AFLAS 100 series produced by Asahi Glass Co., Ltd. are exemplified.

The vinylidene fluoride-tetrafluoroethylene-propylene ternary copolymer which can be used in the present invention contains a repeating unit (2-1), a repeating unit (2-2), and a repeating unit (2-3) shown in a chemical formula 2 in its molecule.

[Chemical Formula 2]

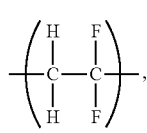
(2-1)

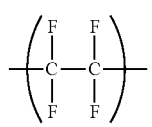
(2-2)

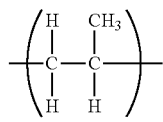
(2-3)

The repeating unit (2-1) is formed of a vinylidene fluoride monomer. The repeating unit (2-2) is formed of the tetrafluoroethylene monomer. The repeating unit (2-3) is formed of the propylene monomer. The content ratio of the repeating unit (2-1) to the entire ternary copolymer is 1 to 70 mol % and preferably 2 to 65 mol %. The content ratio of the repeating unit (2-2) to the entire ternary copolymer is 1 to 70 mol % and preferably 20 to 60 mol %. The content ratio of the repeating unit (2-3) to the entire ternary copolymer is 1 to 70 mol % and preferably 10 to 45 mol %.

As commercially available products of the vinylidene fluoride-tetrafluoroethylene-propylene ternary copolymer which can be used in the present invention, BRE LJ 298005 produced by Sumitomo 3M Ltd., AFLAS SP and AFLAS MZ201 produced by Asahi Glass Co., Ltd. are listed.

As needed, the tetrafluoroethylene-propylene binary copolymer and the vinylidene fluoride-tetrafluoroethylene-propylene ternary copolymer (both are hereinafter referred to as fluorine-containing polymer) are vulcanized by using an organic peroxide such as α,α-bis-t-butyl peroxy-di-isopropylbenzene, 2,5-dimethyl-2,5-di-t-butyl peroxy hexane together with a vulcanizing assistant such as triallyl isocyanurate and triallyl cyanurate, thus showing rubber elasticity.

These fluorine-containing polymers may contain additives including inorganic fillers such as carbon black, silica, silicic acid, diatomaceous earth, and the like; metal oxides such as zinc oxide, magnesium oxide, and the like; age resistors such as octyl-diphenylamine, N-phenyl-1-naphtylamine, and the like.

As the fluororubber composition of the present invention for forming the fluororubber molding, it is possible to use vulcanizable fluororubber compositions containing any of the above-described fluorine-containing polymers singly or by mixing the fluororubber compositions with each other. Considering a vulcanization condition, it is preferable to use the fluororubber compositions singly.

A conventional process for use in rubber processing can be adopted in the method of mixing the above-described compositions with one another or molding the compositions. After the compositions are kneaded by an open roll, a Banbury mixer, a kneader or an enclosed-type mixer, the compositions are press-molded (press-vulcanized), extrusion-molded or injection-molded. To improve the property of the obtained rubber molding, after the rubber composition is molded, it is preferable to secondarily vulcanize the composition by sufficiently heating (for example, 200° C., 24 hours) it in an oven. Through a molding step and a vulcanizing step, the rubber molding is obtained.

The rubber hardness of the rubber molding which can be used in the present invention is 60° to 90° and favorably 70° to 80°. If the rubber hardness is less than 60°, the obtained molding is so soft that the wear resistance thereof deteriorates. If the rubber hardness is more than 90°, the rotation torque of the rolling bearing is so large that the temperature thereof rises. The rubber hardness (degree) is measured in accordance with JIS K 6253.

In consideration of the heat resistance of the rolling bearing inside a transversely stretching device in which heat treatment is performed, it is preferable that the grease to be enclosed in the rolling bearing of the present invention for the tenter clip is fluorine grease containing fluorine oil such as perfluoropolyether (hereinafter referred to as PFPE) oil as a base oil and a PTFE resin powder as a thickener, or grease containing mixed oil of the fluorine oil and the ester oil as a base oil and a mixture of a diurea compound and the PTFE resin powder as a thickener.

The urea compound to be contained in the grease as the thickener thereof contains a urea bond (—NHCONH—) in its molecule. As the urea compound, diurea, triurea, tetraurea, urea urethane, and the like are listed. The diurea having two urea bonds in its molecule is preferable as the urea compound and is shown by a chemical formula 3 shown below. Reference symbol $R_2$ denotes a bivalent aromatic hydrocarbon group having 6 to 15 carbon atoms and shown by a chemical formula 4 shown below.

[Chemical formula 3]
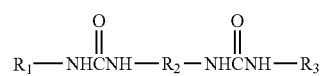

[Chemical formula 4]
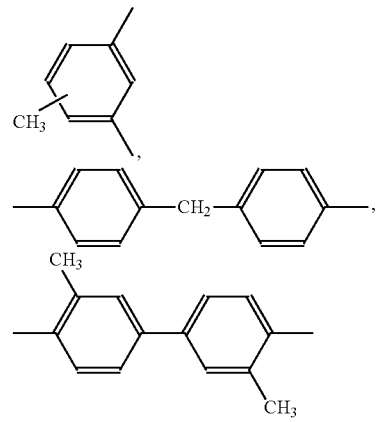

Reference symbols $R_1$ and $R_3$ denote a monovalent aliphatic group, alicyclic group or aromatic group. A urea compound-containing grease containing aliphatic diurea, having aliphatic groups $R_1$ and $R_3$, as a thickener thereof is especially preferable because it mixes with the fluorine grease readily. As an example of the method of producing the urea compound, a method of reacting a diisocyanate compound with an amine compound whose equivalent weight is equal to that of isocyanate group is exemplified.

As the ester oil, it is possible to use diester oil, polyol ester oil, complex ester oil of the diester oil and polyol ester oil, aromatic ester oil, and the like.

As concrete examples of the ester oil, it is possible to list esters of monovalent alcohols having 7 to 22 carbon atoms and aromatic polyvalent carboxylic acids or derivatives thereof and at least one ester oil selected from among esters of monovalent carboxylic acids having 7 to 22 carbon atoms and aliphatic polyvalent alcohols. When the monovalent alcohols and the monovalent carboxylic acids have less than seven carbon atoms or more than 22 carbon atoms, the ester oil is inferior in the lubricity thereof.

As the monovalent alcohols having 7 to 22 carbon atoms, alkyl phenols such as heptyl alcohol, octyl alcohol, nonyl alcohol, decyl alcohol, undecylic alcohol, lauryl alcohol, oleyl alcohol, stearyl alcohol, phenol, methyl phenol, and octyl phenol are listed.

As the monovalent carboxylic acid having 7 to 22 carbon atoms, monovalent carboxylic acids obtained by substituting —CH$_2$OH of the aliphatic monovalent alcohol with —COOH and monovalent carboxylic acids obtained by substituting —OH of the aromatic monovalent alcohol with —COOH are exemplified.

As the aromatic polyvalent carboxylic acid, phthalic acid, isophthalic acid, terephthalic acid, trimellitic acid, trimesic acid, pyromellitic acid, diphenyl tetracarboxylic acid, and benzophenonetetracarboxylic acid are listed.

As the aliphatic polyvalent alcohol, 1,3-butylene glycol, glycerin, propylene glycol, ethyleneglycol, pentadiol, diethylene glycol, polyethylene glycol, polypropylene glycol, trimethylol propane, pentaerythritol, dipentaerythritol, and sorbitol are listed.

When the grease containing the urea as its thickener contacts a fluororubber seal made of FKM at high temperatures, the urea and the unreacted amine crosslink the vinylidene fluoride of the FKM. Thereby the rubber hardens and deteriorates. But the fluororubber molding for use in the rolling bearing of the present invention for the tenter clip is excellently resistant to the urea and the amine, thus having an advantage of not generating such a problem.

EXAMPLES

Fluororubber compositions used in examples and comparative examples are shown below.

By kneading the components mixed with each other at mixing ratios shown in table 1 by using an open roll at 50° C., unvulcanized fluororubber compositions were obtained. The materials shown in table 1 are described below:
(1) Fluororubber composition 1: "VTR8802" (vulcanizing agent was added) produced by du-Pont-Dow-Elastomer Co., Ltd.
(2) Fluororubber composition 2: "AFLAS 150" produced by Asahi Glass Co., Ltd.
(3) Fluororubber composition 3: "A32J" produced by du-Pont-Dow-Elastomer Co., Ltd.
(4) Magnesium oxide: "Kyowamag 150" produced by Kyowa Chemical Industry Co., Ltd.
(5) Calcium hydroxide: "Calbit" produced by Ohmi Chemical Industry Co., Ltd.
(6) Carbon: "N990" produced by Engineered Carbons, Inc.
(7) Co-crosslinking agent: "TAIC" produced by Japan Chemical Company Co., Ltd.
(8) Vulcanizing agent: "Parcadox 14" produced by AKUZO drug Co., Ltd.
(9) Fluororubber composition 4: "AFLAS SP" produced by Asahi Glass Co., Ltd.

The fluororubber composition 1 is a vulcanizable fluororubber composition which comprises a copolymer containing tetrafluoroethylene, propylene, and a to-be-crosslinked monomer consisting of unsaturated hydrocarbon, having two to four carbon atoms, in which a part of hydrogen atoms is substituted with fluorine atoms. The fluororubber composition 2 comprises tetrafluoroethylene-propylene rubber. The fluororubber composition 3 comprises vinylidene fluoride rubber. The fluororubber composition 4 comprises vinylidene fluoride-tetrafluoroethylene-propylene rubber.

Examples 1 through 3 and Comparative Example 1

By using a vulcanizing press machine, a vulcanized molding was obtained from the unvulcanized fluororubber composition. A primary vulcanization was performed for 12 minutes by keeping the temperature of a die at 170° C. Thereafter the vulcanized molding was secondarily vulcanized in a constant-temperature bath at 200° C. for 24 hours.

Specimens were formed by punching the obtained vulcanized molding into the configuration of the specimen of type 3 as specified by JIS K 6251. The specimens were immersed in ester oil (two wt % of amine-based antioxidant [alkylated diphenylamine] was added to Hatcol H2362 [kinematic viscosity: 70 mm$^2$/second at 40° C.] produced by Nippon Steel Chemical Co., Ltd.) in the condition of 170° C.×500 hours. The volumes of the specimens before and after they were immersed were measured to compute the change rate of the volume of each specimen. The volume was measured in accordance with JIS K 6258. The change rate of the volume was computed in accordance with an equation shown below. Results are shown in table 1.

Change rate (%) of volume=100×(volume after immersion−volume before immersion)/volume before immersion

TABLE 1

|  | Example | | | Comparative Example |
|---|---|---|---|---|
|  | 1 | 2 | 3 | 1 |
| Mixing ratio (part by weight) | | | | |
| Fluororubber composition 1 | 100 | — | — | — |
| Fluororubber composition 2 | — | 100 | — | — |
| Fluororubber composition 3 | — | — | — | 100 |
| Fluororubber composition 4 | — | — | 100 | — |
| Magnesium oxide | 8 | — | — | 3 |
| Calcium hydroxide | — | — | — | 6 |
| Carbon | 30 | 35 | 35 | 20 |
| Co-crosslinking agent | — | 5 | 5 | — |
| Vulcanizing agent | — | 1 | 1 | — |
| Volume change rate of sealing member (%) | 8 | 10 | 13 | 24 |

The specimens of the examples 1 through 3 slightly deteriorated and showed excellent resistance to the ester oil, although they were immersed for a long time.

The specimen of the comparative example 1 greatly changed its volume when it was immersed in the ester oil. Melting was observed on the surface of the specimen after the elapse of 500 hours.

Because the rolling bearing of the present invention for the tenter clip has excellent resistance to the ester oil, the rolling bearing can be used preferably in a condition in which it contacts ester oil.

The invention claimed is:

1. A rolling bearing for a tenter clip, comprising an inner ring; an outer ring; a plurality of rolling elements interposed between said inner ring and said outer ring; and a sealing member covering openings disposed at both axial ends of said inner ring and said outer ring,
    wherein a periphery of said outer ring is lubricated with ester oil,
    wherein said sealing member is a fluororubber molding obtained by molding a vulcanizable fluororubber composition expressed by (A) or (B) shown below:
    (A) a vulcanizable fluororubber composition comprising a copolymer containing tetrafluoroethylene, propylene, and a to-be-crosslinked monomer consisting of unsaturated hydrocarbon, having two to four carbon atoms, in which a part of hydrogen atoms is substituted with fluorine atoms,
    (B) at least one fluororubber composition selected from a vulcanizable fluororubber composition containing a tetrafluoroethylene-propylene binary copolymer and a vulcanizable fluororubber composition containing a vinylidene fluoride-tetrafluoroethylene-propylene ternary copolymer.

2. The rolling bearing for the tenter clip according to claim 1, wherein, in said sealing member which covers said openings disposed at said both axial ends of said inner ring and said outer ring, at least a portion of said sealing member which contacts said ester oil is made of said vulcanizable fluororubber composition expressed by said (A) or said (B).

3. The rolling bearing for the tenter clip according to claim 2, wherein said ester oil contains an amine-based additive.

4. The rolling bearing for the tenter clip according to claim 1, wherein said to-be-crosslinked monomer is at least one monomer selected from among trifluoroethylene, 3,3,3-trifluoropropene-1; 1,2,3,3,3-pentafluoropropene; 1,1,3,3,3-pentafluoropropylene; and 2,3,3,3-tetrafluoropropene.

5. The rolling bearing for the tenter clip according to claim 1, wherein said vulcanizable fluororubber composition expressed by said (A) contains vinylidene fluoride as a copolymer component thereof.

6. The rolling bearing for the tenter clip according to claim 1, wherein a grease is enclosed on peripheries of said rolling elements.

7. The rolling bearing for the tenter clip according to claim 6, wherein said grease is either a single fluorine grease or a grease which comprises a base oil which is a mixed oil of fluorine oil and ester oil and a thickener consisting of a mixture of a diurea compound and polytetrafluoroethylene resin powder.

* * * * *